Aug. 6, 1935.   K. L. HERRMANN ET AL   2,010,362
ANTIFRICTION BEARING
Filed Feb. 12, 1934

INVENTORS
Karl L. Herrmann
Harold Frauenthal
BY
ATTORNEYS.

UNITED STATES PATENT OFFICE 2,010,362

ANTIFRICTION BEARING

Karl L. Herrmann and Harold Frauenthal,
South Bend, Ind.

Application February 12, 1934, Serial No. 710,814

10 Claims. (Cl. 308—207)

This invention relates to anti-friction bearings and particularly to bearings suitable for carrying heavy loads such, for example, as in rolling mills and in other machinery doing heavy duty work.

The principal object of our invention is to provide an anti-friction bearing having an outer race member which floats in its cage and which is capable of being rotated while the bearing is in service.

A further object is to provide an anti-friction bearing having a floating outer race member capable of being rotated by hydraulic means while the bearing is in service.

A further object is to provide an anti-friction bearing having a floating outer race member which may be rotated either hydraulically or by mechanical means while the bearing is in service.

A further object is to provide a roller bearing comprising an inner race member, an outer race member, and rollers interposed therebetween, the outer race member being supported in a suitable cage but rotatable relative thereto, and means to permit rotation of the outer race member in its cage to thus permit even wear thereof irrespective of the heavy loads to which it may be subjected.

The above being among the objects of our invention, the same consists of certain details of construction and methods of manufacture which will be apparent from the detailed description to follow.

In the drawing, in which like numerals refer to like parts throughout the several views.

Figure 1:
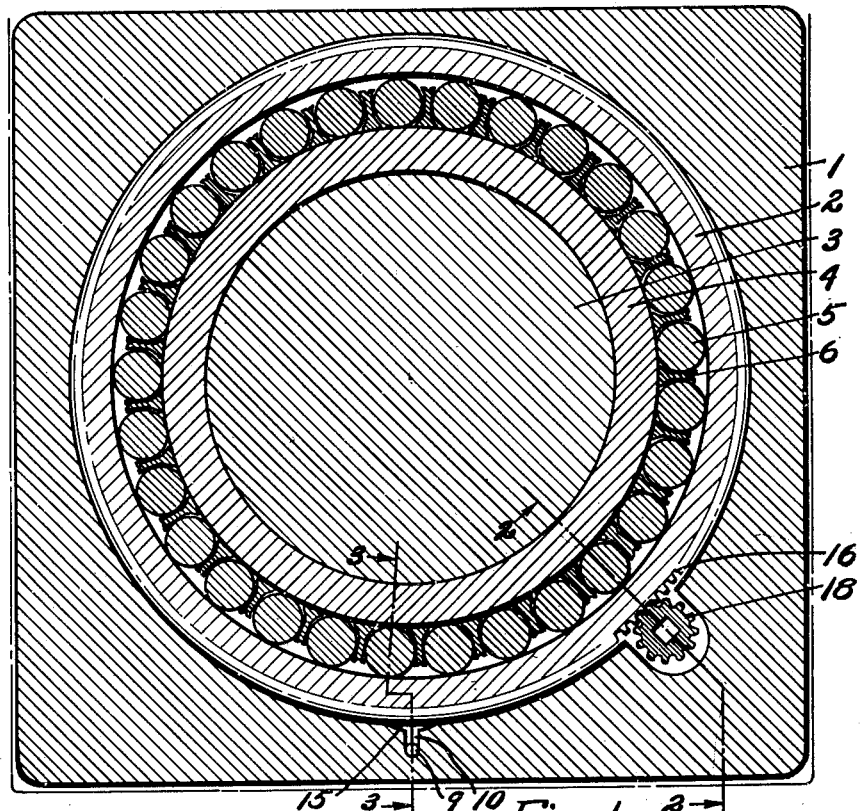
Fig. 1 is a detailed transverse sectional view taken on the broken line I—I of Fig. 2, showing our invention incorporated therein.

Anti-friction bearings used in rolling mills and other machinery doing heavy duty work are subjected to exceedingly heavy loads which have caused the outer race member to wear and get out of round in a relatively short time due to the fact that the load is directed only in one direction against the bearing so that only a portion of the race member is subjected to the heavy load, thus causing wear on only that portion of the race member. Because of the outer race member becoming worn at one portion only thereof, the life of the bearing is relatively short and it has heretofore been necessary to make frequent repairs to or replacement of the outer race member.

In our present invention, we have overcome this difficulty to a great extent by providing means to permit the outer race member to rotate in its support either continuously or at frequent intervals so that the entire inner face of the outer race member may be subjected to the load imposed upon it and thus provide even wear thereof which will materially lengthen the life of the bearing and, therefore, materially reduce maintenance costs.

In the drawing, we have illustrated diagrammatically a chuck or cage 1 in which is rotatably mounted the outer race member 2 of the bearing. A shaft or rotating member 3 extends into the cage 1 and has mounted thereon an inner race member 4. Interposed between the race members 2 and 4, are rollers 5 which may be in one or a plurality of rows, depending upon the size and design of the bearing, the rollers preferably being mounted in retainers 6. Our invention is not limited to a roller bearing having a specified number of rows of rollers, neither is it limited to a bearing having rollers mounted in retainers as a full roller type bearing may be used if found desirable. In the construction illustrated, the chuck or cage 1 is provided with a flange 7 at one side thereof against which one edge face of the outer race member 2 is adapted to abut. The bearing is preferably held in position by a flanged member 8 abutting against the opposite edge face of the outer race member 2 secured in any suitable manner to the edge face of the cage 1.

As illustrative of one means for causing rotation of the outer race member 2 relative to its support, we use a fluid such as oil and provide ports 9 in the cage 1 and ports 10 perpendicular thereto leading to the inner face of the cage member 1. A familiar practice would be to drill the ports 10 and then close the outer ends thereof by the screw plugs 11. Inserted into the outer end of the port 9 is a pipe 12 which may be screwthreaded or secured therein in any suitable manner. The pipe 12 is operatively connected with a pump 13 which may be driven by a pulley 14 from a suitable power source not shown, or by other means well known to those familiar with pump construction. The fluid such as a suitable oil is forced from the pump 13 through the pipe 12 into the port 9 and through the ports 10 to the under face of the outer race member 2. The pressure thus built up in the line from the pump to the outer race member 2 will be sufficient to relieve the outer race member of its load at its lower side and thus raise it sufficiently to relieve the pressure thereon and permit the same to rotate relative to the cage or chuck 1. As the outer race member 2 is rotated, another portion thereof will be moved to the position to receive the heavy thrust imposed upon it and thus permit even wear of this member. The pump 13 may be run continuously or intermittently at the will of the operator or as necessity may require, but sufficiently often to permit frequent rotation of the outer race member to relieve it of the heavy load imposed upon one portion only thereof.

Figure 3:
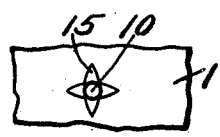
Fig. 3 is a fragmentary sectional view taken on the line 3—3 of Fig. 1, showing the port for admitting fluid to the outer face of the outer race member.
Figure 2:
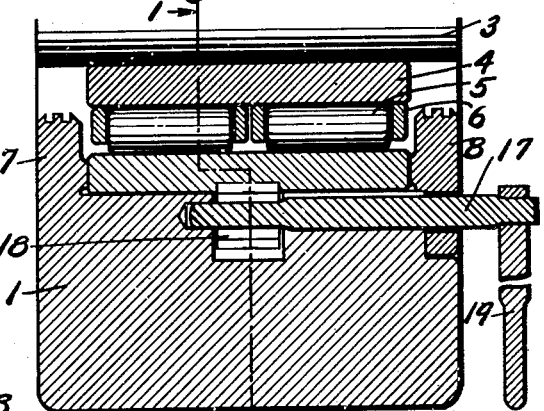
Fig. 2 is a fragmentary sectional view taken on the line 2—2 of Fig. 1.
Figure 4:
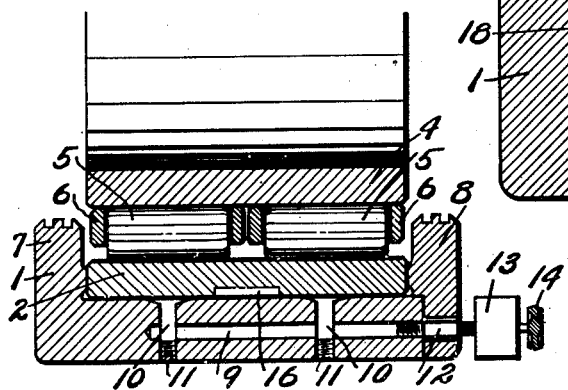
Fig. 4 is a detailed fragmentary view showing one of the ports in the outer race member.

In Figs. 3 and 4, we have shown the ports 10 relieved at their inner ends at 15 to thus permit the fluid to have greater contact with the outer race member and to assist in relieving the friction between that member and its cage at the lower side of the bearing.

In some instances it may be desirable to mechanically rotate the outer race member and for that purpose, we have shown the outer race member 2 as provided with teeth 16 formed in the periphery thereof. A shaft 17 suitably supported in the cage 1 is preferably squared at its inner end to receive the pinion 18 which is adapted to mesh with the gear teeth 16 formed on the outer race member 2. Connected to the outer end of the shaft 17 is a handle 19 which may be directly secured to the shaft or through a suitable ratchet mechanism so that in either case as the operator moves the handle the shaft and the pinion 18 will be caused to rotate therewith and thus rotate the outer race member 2 for the purpose which has heretofore been described in detail.

Although we have shown the handle 19 as the actuating means for the shaft 17, it is evident that we may substitute power driven means if so desired.

It will be evident that the manually rotating means may be used in conjunction with the hydraulic means to cause rotation of the outer race member or the hydraulic and manual means may be used independently of each other. In either case, the outer race member will be caused to rotate relative to its support and thus permit different portions of the inner face thereof to receive the heavy thrust load to which this member is subjected.

We have illustrated and described the outer race member as being rotatable relative to its support; however, it will be well understood by those skilled in the art that occasions may arise where it is desirable to substitute a stationary member for the rotatable shaft 3 in which case the inner race member would be rotated relative to its support or cage and the outer race member held against rotative movement. Our invention is, therefore, not limited to the rotation of the outer race member only relative to its support but comprises means for rotating either the inner or outer race members relative to their supports.

The drawing and specification are to be taken as illustrative only of two embodiments of our invention as it will be well understood by those skilled in the art that various modifications can be made both in methods of manufacture and details of construction without departing from the spirit and substance of our invention, the scope of which is to be measured entirely by the sub-joined claims.

What we claim is:

1. In combination with an anti-friction bearing including an inner race member, rollers surrounding the same, an outer race member, and a cage therefor, ports formed in said cage, and means to force fluid under pressure through said ports against the outer face of said outer race member to counteract the load pressure thereon and permit full rotation thereof relative to said inner race member and said cage.

2. In combination with an anti-friction bearing including an inner race member, anti-friction members surrounding the same, an outer race member, and a cage therefor, teeth on the periphery of said outer race member, a pinion engageable with said teeth supported in said cage, and means independent of said inner race member to rotate said pinion to thereby rotate said outer race member.

3. In combination with an anti-friction bearing including an outer race member and a cage therefor, fluid pressure means to raise said outer race member relative to said cage to counteract the load pressure on said outer race member, and mechanically actuated means to rotate said race member relative to said cage.

4. In combination with an anti-friction bearing including an outer race member and a cage therefor, means for rotating said race member relative to said cage comprising, teeth formed on the periphery of said race member, a pinion in engagement with said teeth, a shaft supported in said cage connected with said pinion, and means to rotate said shaft to thereby rotate said race member.

5. An anti-friction bearing comprising, an inner race member, a non-perforated outer race member, anti-friction members therebetween, a cage directly surrounding said outer race member, and means applying pressure against the load side of said outer race member to raise said race members and anti-friction members relative to said cage to cause rotation of said outer race member relative to said inner race member and said cage.

6. An anti-friction bearing comprising, an inner race member, a non-perforated outer race member, anti-friction members therebetween, a cage surrounding said outer race member, and means for applying pressure against the load side of said outer race member to raise the latter relative to said cage, and manually operable means engageable with the peripheral face of said outer race member to rotate the same relative to said cage.

7. An anti-friction bearing comprising, an inner race member, a non-perforated outer race member, anti-friction members therebetween, a cage surrounding said outer race member, and means for applying pressure against the load side of said outer race member to raise the latter relative to said cage, and means to rotate said outer race member relative to said cage comprising, a rotatable member engageable with the peripheral face of said outer race member, means supporting said rotatable member carried by said cage, and means exteriorly of said cage for rotating said member.

8. An anti-friction bearing comprising, an inner race member, a non-perforated outer race member, anti-friction members therebetween, a cage surrounding said outer race member, and means for applying fluid under pressure against the load side of said outer race member to raise the inner race member, anti-friction members and outer race member relative to said cage and to cause rotation of said outer race member relative to said cage.

9. In combination with an anti-friction bearing having an inner race member, an outer race member, rollers interposed therebetween, and a cage for said outer race member, hydraulic means to counteract the load pressure on the load side of said outer race member to thereby raise said inner race member and rollers relative to said cage and permit rotation of said outer race member relative to said cage.

10. In combination with an anti-friction bearing having a cage, an inner race member, an outer race member mounted concentrically relative to said cage and inner race member, and anti-friction members interposed therebetween, manually actuated means engageable with said outer race member to rotate the same any part of a complete revolution without moving the axial position of said inner race member.

KARL L. HERRMANN.
HAROLD FRAUENTHAL.